(12) United States Patent
Jackson

(10) Patent No.: US 7,160,402 B2
(45) Date of Patent: Jan. 9, 2007

(54) SNOW DECORATION

(75) Inventor: Richard Charles Jackson, Minneapolis, MN (US)

(73) Assignee: Can 56, Inc., Eden Prairie, MN (US)

( * ) Notice: Subject to any disclaimer, the term of this patent is extended or adjusted under 35 U.S.C. 154(b) by 566 days.

(21) Appl. No.: 10/738,356

(22) Filed: Dec. 16, 2003

(65) Prior Publication Data

US 2005/0126693 A1     Jun. 16, 2005

(51) Int. Cl.
*B32B 37/00* (2006.01)
(52) U.S. Cl. .................. 156/63; 156/242; 156/245; 156/256; 428/15
(58) Field of Classification Search ................ 156/63, 156/242, 245, 297, 152, 256; 428/15
See application file for complete search history.

(56) References Cited

U.S. PATENT DOCUMENTS

| 1,890,127 | A | | 12/1932 | Oftedahl |
| 2,221,194 | A | | 11/1940 | Keller et al. |
| 3,020,811 | A | | 2/1962 | Lincoln et al. |
| 3,091,998 | A | | 6/1963 | Wehr et al. |
| 3,264,160 | A | * | 8/1966 | Donofrio ................... 156/196 |
| 3,443,492 | A | | 5/1969 | Pleass |
| 3,736,847 | A | | 6/1973 | Hickey |
| 5,301,512 | A | * | 4/1994 | Yamamoto .................... 62/74 |
| 6,065,253 | A | * | 5/2000 | Ojeda .......................... 52/79.9 |
| 6,258,871 | B1 | | 7/2001 | Brown, III |
| 6,280,283 | B1 | * | 8/2001 | Sisler ......................... 446/100 |
| 6,455,113 | B1 | | 9/2002 | Bilodeau |
| 6,566,416 | B1 | | 5/2003 | Brown, III |

* cited by examiner

*Primary Examiner*—Jeff H. Aftergut
(74) *Attorney, Agent, or Firm*—Fulbright & Jaworski L.L.P.

(57) ABSTRACT

A decorative device to simulate a snowfield in a decorative winter scene. In one embodiment, the decorative device is comprised of white pigmented, silicone rubber elements having rounded edges and molded generally to resemble a snowfield. The decorative device can be applied to a structure in a decorative winter scene or it can also be applied to a surface surrounding a structure in a decorative winter scene. A method of transforming a decorative season inspecific model for use in a winter theme decorative scene is provided.

3 Claims, 3 Drawing Sheets

SNOW DECORATION

FIELD OF THE INVENTION

Generally, the invention relates to an artificial snow decoration. More specifically, the invention relates to a decorative device for simulating a snowfield in a miniature winter scene.

BACKGROUND OF THE INVENTION

Decorative winter scenes are a common form of seasonal decoration. This is especially so during the winter season wherein decorative winter scenes are commonly utilized to decorate homes and stores. A common decorative winter scene includes a collection of miniature models depicting a town or village scene. These models will typically include a number of structures, such as a houses, barns, stores, etc. The structures and the area surrounding the structures may contain artificial snow. The artificial snow may include white fiber batting and/or white flakes, such as of a plastic material. Additionally, the structures may have a permanent snowfield integrated upon an upper surface thereof, such as a snowfield painted upon a roof surface of a house. As an incorporated snowfield is permanent and can not be removed from the structure, the structure is limited in the sense that it depicts only a winter scene. As a result, many winter scene-based structures are only utilized for decoration during the Fall and winter seasons.

Plastic flakes are also commonly used to provide the appearance of snow to decorative winter scenes. These plastic flakes are typically deposited over the winter scene or are sprayed onto the winter scene. While they provide a realistic appearance of snow, they are also burdensome to maintain as the flakes are easily displaced by gusts of air.

As such, there is a need in the art for a temporary decorative device which can be used to simulate artificial snow, and which avoids or minimizes the drawbacks of the prior art.

SUMMARY OF THE INVENTION

The present invention is a decorative device typically used to simulate snowfields in a decorative winter scene. In one embodiment, the decorative device is comprised of white pigmented, silicone rubber elements having rounded edges and molded generally to resemble a snowfield. The decorative device can be applied to a structure in a decorative winter scene or it can also be applied to a surface surrounding a structure in a decorative winter scene. Multiple pieces of the decorative device can be laid side by side to simulate larger fields of snow. The decorative device may be used to temporarily transform a season inspecific model, such as a house or other building, into a winter themed scene.

The decorative device is preferably of a pliable material having a somewhat tacky surface so that the device is able to adhere to a surface, such as a roof surface on a miniature village structure. The decorative device is soft, flexible, and is also easily cut to be of an appropriate size for use in a decorative winter scene.

BRIEF DESCRIPTION OF THE DRAWINGS FIGURES

For purposes of facilitating and understanding the subject matter sought to be protected, there is illustrated in the accompanying drawings an embodiment thereof. From an inspection of the drawings, when considered in connection with the following description, the subject matter sought to be protected, its construction and operation, and many of its advantages should be readily understood and appreciated.

DETAILED DESCRIPTION OF THE PREFERRED EMBODIMENTS

Figure 1:
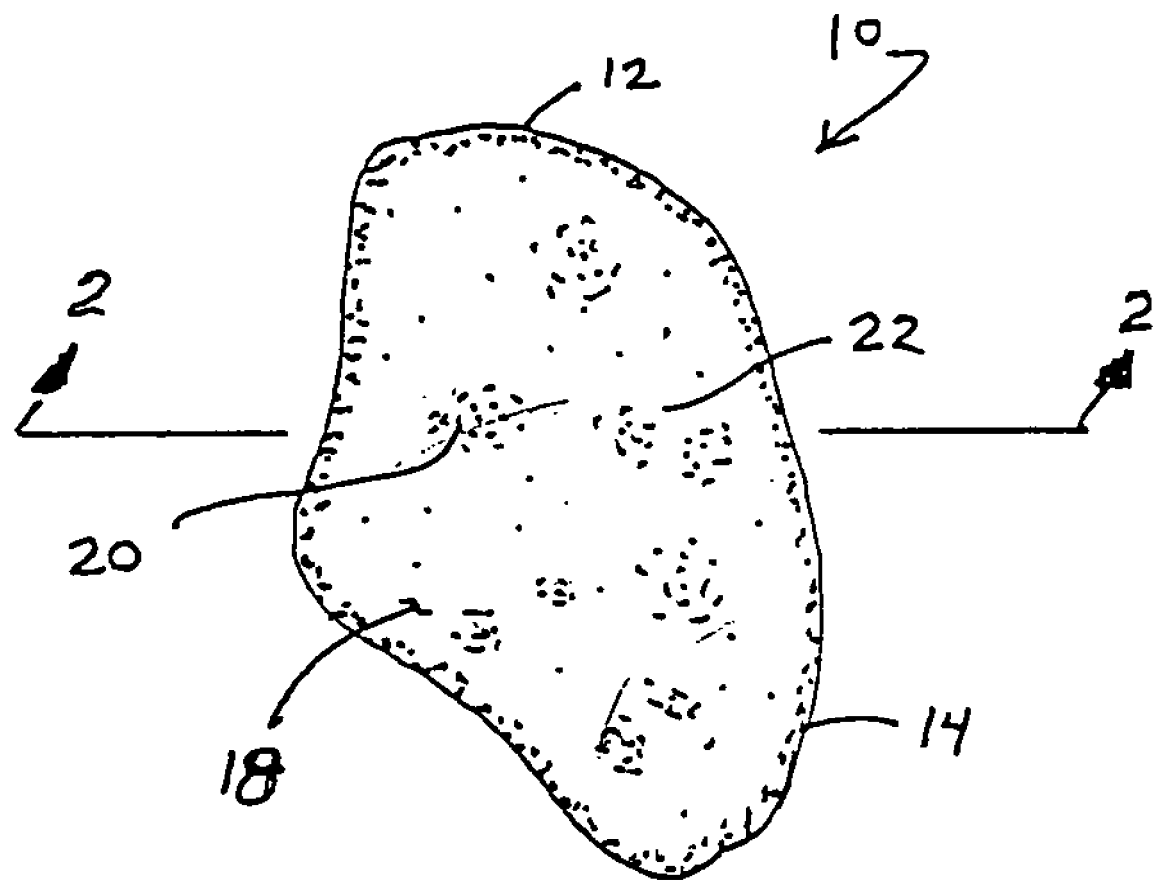
FIG. 1 is a overhead perspective view of one embodiment of the subject decorative device.
Figure 2:
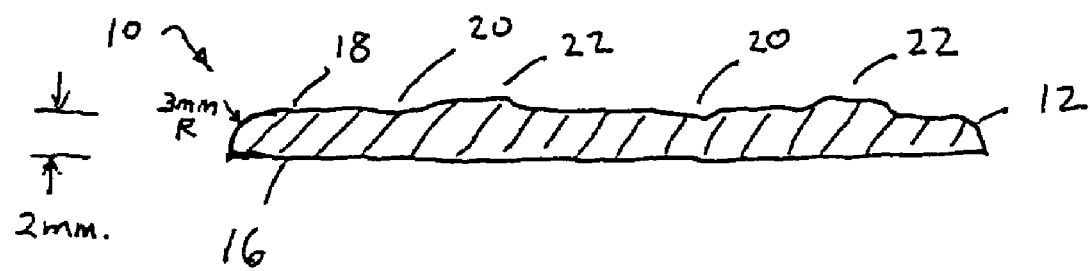
FIG. 2 is a cross sectional view of the decorative device of FIG. 1 taken along lines 2—2.

As shown in FIGS. 1 and 2, the present invention is a decorative device typically used to simulate snowfields in a decorative winter scene. In one embodiment, the decorative device 10 is a white pigmented, silicone rubber element having rounded edges 12 and shaped generally to resemble a snowfield. The decorative device 10 includes a body 14 having a bottom surface 16 and a top surface 18.

Figure 4:
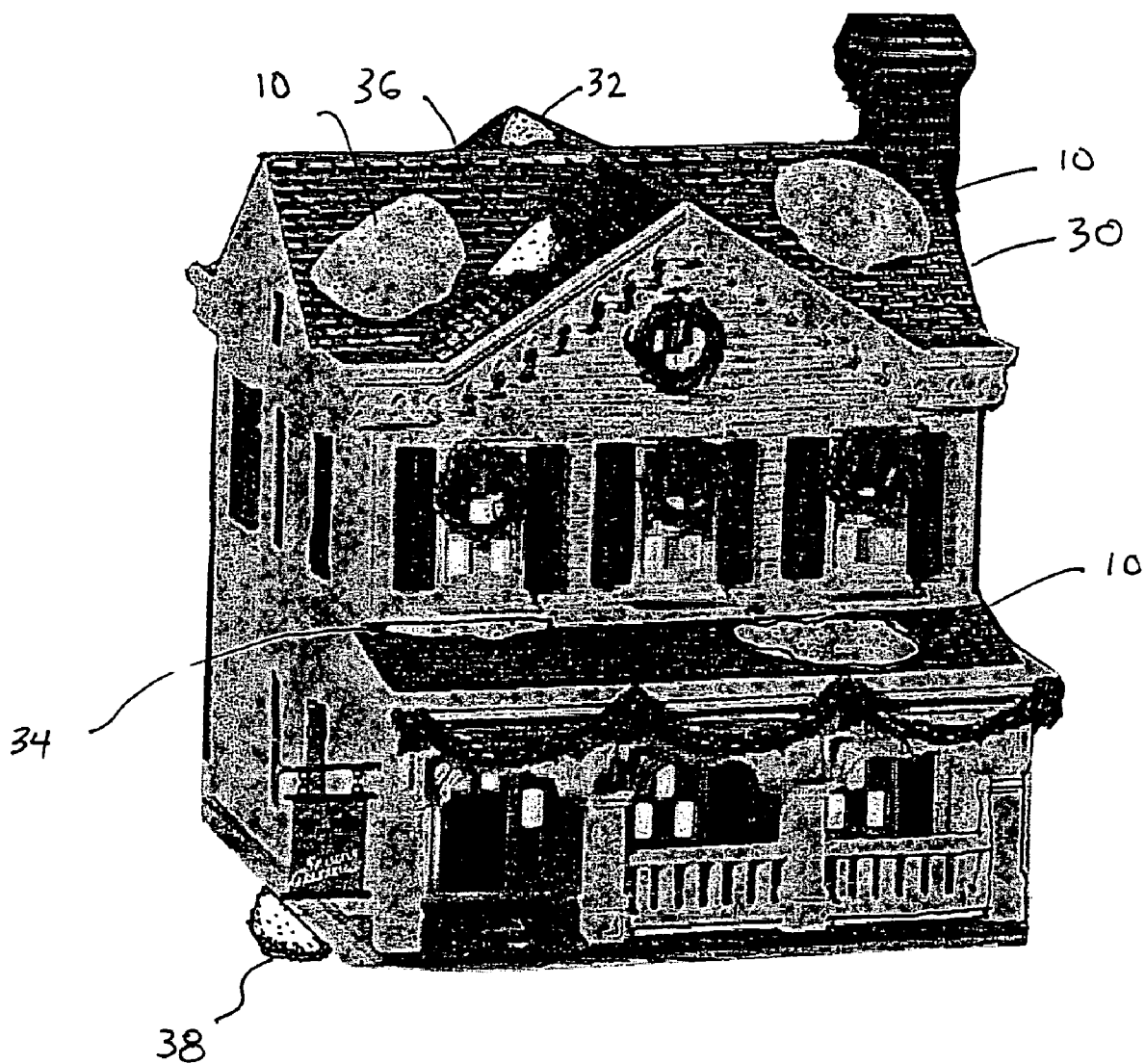
FIG. 4 is a perspective view of a structure having a plurality of subject decorative device attached thereto.

In one embodiment, the bottom surface 16 is substantially flat and shiny and provides a generally tacky surface. As illustrated in FIG. 4, the inherently tacky bottom surface 16 can partially adhere the device 10 to another surface or structure. When placed upon a decorative model, the tacky nature of the bottom surface 16 limits the movement of the decorative device 10. It is also contemplated that an adhesive or an adhesive tape may be applied to the bottom surface 16 in order to ensure that the decorative device 10 remains stationary.

In one embodiment, the top surface 18 has a contoured surface giving the appearance of a snowfield. With particular reference to FIG. 2, the top surface 18 includes a perimeter that is bounded by sloped and rounded edges 12. Top surface 18 has a contoured surface having a plurality of depressions 20 and prominences 22.

In one embodiment, the present invention is manufactured using a liquid silicone rubber compound such as dimethylsilicone. The silicone compound enables the decorative object 10 to be soft, flexible, resilient and easily cut. The use of the silicone material enables the decorative device 10 to resiliently maintain its shape. The silicone formulation can be any that is generally known in the art. A white pigment is added to the liquid silicone rubber solution to provide the appropriate coloring. Other silicone-based materials, as well as other pliable plastic materials, may be utilized to practice the present invention.

Figure 3:
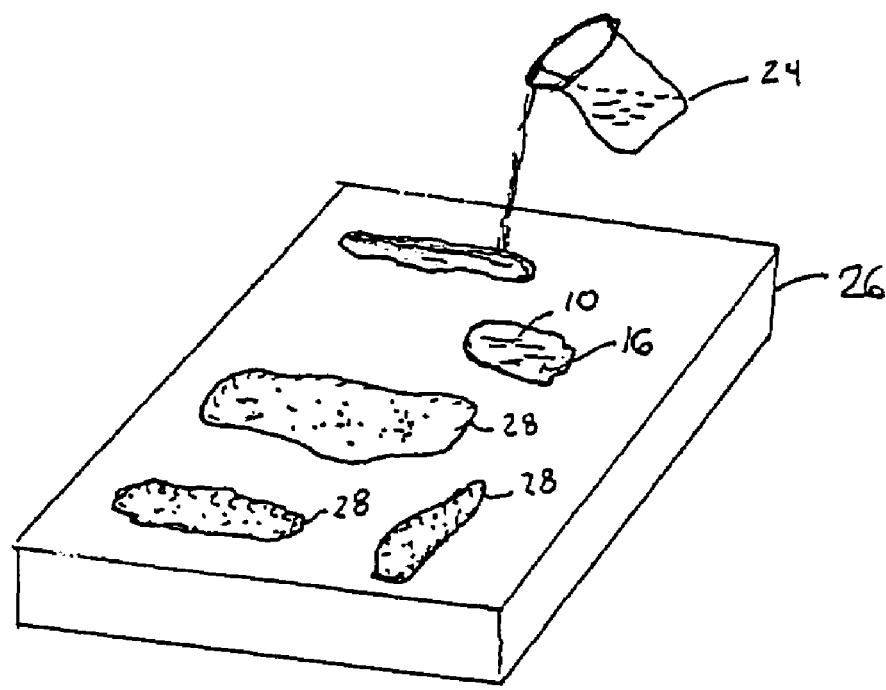
FIG. 3 is perspective view depicting a manufacturing process of the decorative device.

As shown in FIG. 3, in one embodiment the device 10 can be formed by pouring a liquid silicone rubber compound 24 into a mold 26 having a plurality of cavities 28. Each cavity 28 has rounded edges and a configured surface corresponding to edges 12 and top surface 18 of device 10. Once the liquid silicone rubber has cured to form the decorative device 10, the decorative device 10 is removed from the mold 26 and packaged for distribution. Alternatively, it is also contemplated that the liquid rubber compound be poured onto a flat surface and allowed to cure. Yet another embodiment of device 10 may be manufactured using known injection molding technology.

As shown in FIG. 4, in one embodiment, the decorative device 10 can be applied to a structure 30 to create a decorative winter scene. The bottom surface 16 enables the decorative device 10 to partially adhere itself to the structure 30 enabling the decorative device 10 to remain in place upon structure 30. The decorative device 10 is soft and is easily cut to be of an appropriate size for use. A user-configured decorative device 10 can also engage corners, chimneys or eaves of structure 30. For example, reference numerals 32, 34, 36 and 38 illustrate devices 10 which have been user-configured (linearly cut) to more accurately depict a snowfield upon or adjacent to structure 30. The decorative device 10 can also be used with other structures in a decorative winter scene such as vehicles, etc.

The decorative device can also be applied to a surface surrounding a structure in a decorative winter scene. Multiple pieces of the decorative device 10 can be laid side by side to simulate larger fields of snow. The decorative device 10 can also be cut to fit as desired in a decorative winter scene.

A method of transforming a decorative scene into a winter themed decorative scene is provided. Steps of the method include providing a plurality of season inspecific models such as a house model, providing a plurality of decorative devices 10 each having a generally tacky surface, placing some of the plurality of decorative devices 10 directly upon upper surfaces of the models, wherein the tacky surface of the decorative devices 10 maintains the resilient form in place upon the model, cutting others of the plurality of decorative devices 10 to correspond to edges on one or more of the models, and placing the others of the plurality of decorative devices 10 in relation to the edges so as to transform the decorative scene into a winter theme decorative scene. In this manner, a season inspecific model, such as a house or building, may be temporarily transformed for use in a winter themed scene.

The matter set forth in the foregoing description and accompanying drawings is offered by way of illustration only and not as a limitation. While a particular embodiment has been shown and described, it will be obvious to those skilled in the art that changes and modifications may be made without departing from the broader aspects of applicant's contribution. The actual scope of the protection sought is intended to be defined in the following claims when viewed in their proper perspective based on the prior art.

What is claimed is:

1. A method of transforming a decorative scene, the steps comprising:

providing a season inspecific house model in a decorative scene;

providing a plurality of white generally flat, resilient forms each having a generally tacky surface, and a matte surface generally opposite the tacky surface;

placing some of the plurality of resilient forms directly upon upper surfaces of the house model, wherein the tacky surface of the resilient form maintains the resilient in place upon the house model;

cutting others of the plurality of resilient forms to correspond to edges on the house model; and placing the others of the plurality of resilient forms in relation to the edges so as to transform the house model decorative scene into a winter theme decorative scene.

2. The method of claim 1 wherein the edges on house model includes a roof line or a wall intersection.

3. A method of transforming a decorative scene having a house model, the steps comprising:

providing a season inspecific house model, said house model having a roof;

providing a plurality of white generally flat, resilient forms each having a generally tacky surface, and each having a matte surface;

placing some of the plurality of resilient forms directly upon the roof of the model, wherein the tacky surface of the resilient form maintains each of the resilient forms in place upon the model;

cutting others of the plurality of resilient forms to correspond to linear edges on the model; and placing the others of the plurality of resilient forms in relation to the linear edges so as to transform the season inspecific house model into a winter season house model.

* * * * *

UNITED STATES PATENT AND TRADEMARK OFFICE
CERTIFICATE OF CORRECTION

PATENT NO.         : 7,160,402 B2
APPLICATION NO. : 10/738356
DATED                 : January 9, 2007
INVENTOR(S)       : Richard Charles Jackson It is certified that error appears in the above-identified patent and that said Letters Patent is hereby corrected as shown below:

In Claim 1, line 7, please change "amatte" to --a matte--.

Signed and Sealed this

Twentieth Day of March, 2007

JON W. DUDAS
*Director of the United States Patent and Trademark Office*